UNITED STATES PATENT OFFICE.

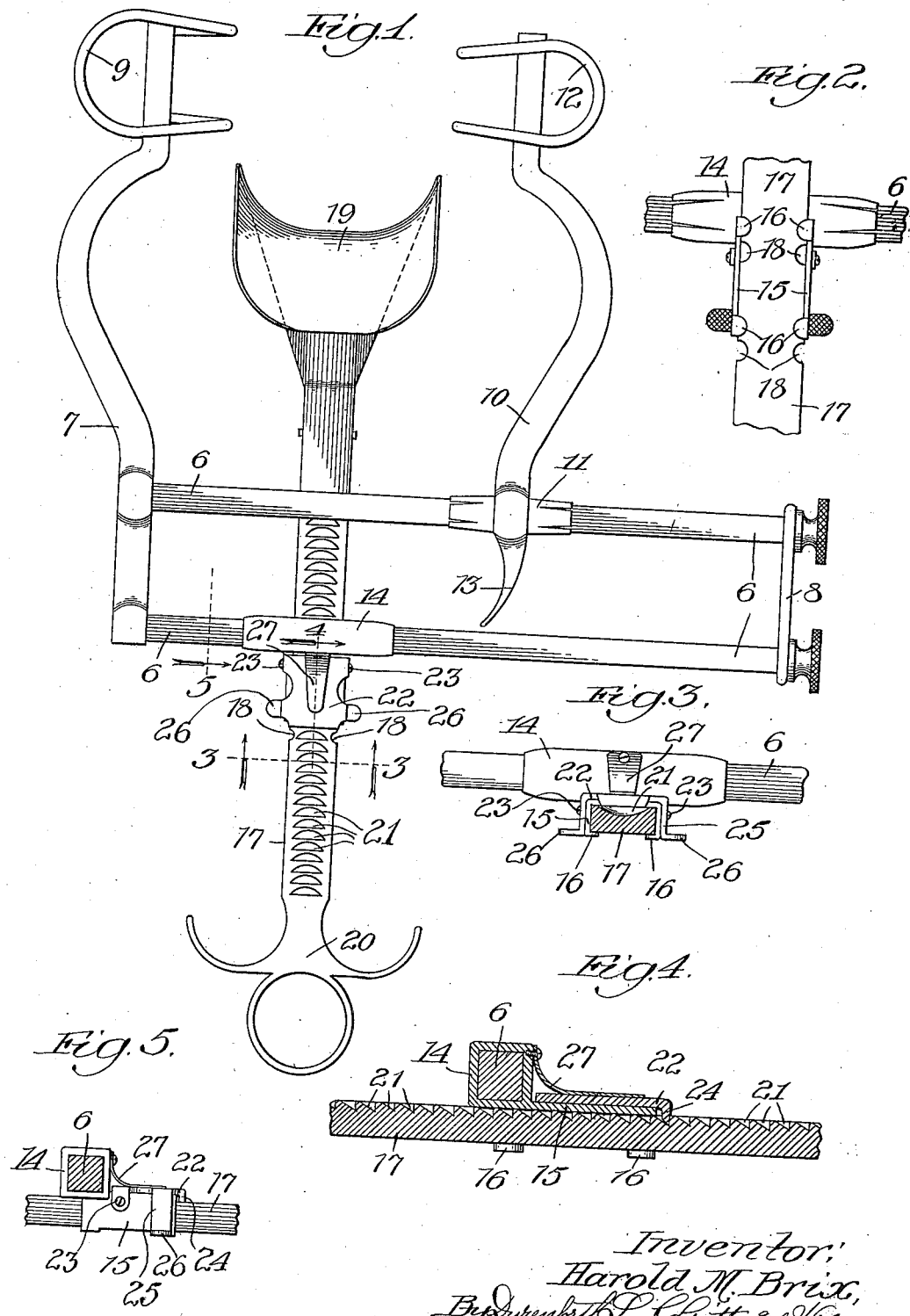

HAROLD M. BRIX, OF CHICAGO, ILLINOIS, ASSIGNOR TO SHARP & SMITH, OF CHICAGO, ILLINOIS, A CORPORATION OF ILLINOIS.

RETRACTOR.

1,311,313.   Specification of Letters Patent.   Patented July 29, 1919.

Application filed June 22, 1918. Serial No. 241,329.

*To all whom it may concern:*

Be it known that I, HAROLD M. BRIX, a citizen of the United States, residing at Chicago, in the county of Cook and State of Illinois, have invented a new and useful Improvement in Retractors, of which the following is a specification.

My invention relates to certain new and useful improvements in retractors and is fully described and explained in the specification and shown in the accompanying drawings, in which—

Figure 1 is a top plan view of the retractor; Fig. 2 is a bottom plan of the movable clip; Fig. 3 is a section on the line 3 of Fig. 1; Fig. 4 is a section on the line 4 of Fig. 1; and Fig. 5 is a section on the line 5 of Fig. 1.

Referring to the drawing, 6 are two parallel rectangular bars spaced apart at their left end by a bar 7 which they support, and spaced at the right end by a plate 8. The arm 7 has at its end a hook 9. 10 is a movable arm carried by a square sleeve 11 slidable on one of the bars 6, the arm 10 carrying a hook 12 similar to the hook 9. The arm 10 can be drawn sidewise by a finger-piece 13 and when drawn away from the arm 7 the sleeve 11 will bind on the bar 6 if pressure be applied to the arm 10 near its end so that the hooks 6 remain separated, although they can readily be brought together by pressing on the arm 10 adjacent to the sleeve 11.

Slidable upon the other bar 6 is a square sleeve 14 preferably formed integrally with a channel-shaped extension or clip 15, at the under corners of which are inwardly projecting lugs 16. 17 is a transversely slidable bar provided with notches 18 on its two sides, adapted when in proper position to register with the lugs 16. This transversely slidable bar can be brought into proper registration with the clip, pushed into position from below and then pushed transversely in either direction, and will be held in place against vertical displacement. The transversely slidable bar 17 has a hook 19 at one end and a suitable handle 20 at the other. Its upper surface is cut by a series of notches 21 forming shoulders, and the clip carries a dog 22 pivoted at one end on screws 23, having a hook 24 in its opposite end and provided also with downward extensions 25 straddling the clip and terminating in outwardly extending operating ears 26. The dog is spring-pressed downward by a flat spring 27.

This arrangement is such that the transversely slidable bar can be positioned at any desirable point between the arms 7 and 10, can be freely drawn back to produce such tension on the incision as may be sought and will be held in any retracted position by the dog 22. Yet by raising the dog, through the manipulation of the ears 26, the transversely slidable bar and the hook 19 can be instantly moved back.

Under practical conditions the present device will most frequently be used in inverted position, that is, with the various hooks facing downward. Under such conditions it is peculiarly easy to remove the transversely slidable bar and adjust the two arms 7 and 10 with their hooks in position in the first instance. The hook 19 can then be adjusted to position in the incision and then brought to proper registry in the clip without producing any substantial tension on the incision. It can then be drawn back to open the incision as much as is desired and will be self-locking. The outwardly-turned ears 26, in this inverted position, will be within reach of the operator's finger at all times and can be depressed to allow the return of the hook 19.

It is evident that the present structure is capable of complete disassembly in a simple manner and that the parts can therefore readily be cleaned and sterilized.

I realize that considerable variation is possible in the details of the construction herein shown, and I do not intend to limit myself thereto, except as pointed out in the following claims, in which it is my intention to claim all the novelty inherent in the device as broadly as is permitted by the state of the art.

What I claim as new and desire to secure by Letters Patent is:

1. In combination, a pair of parallel bars, a pair of opposed hooks carried by said bars and adapted to be drawn apart and fixed in position, a third hook adapted to be moved transversely of the line of said first two hooks, and carried by a bar transversely slidable on one of said first mentioned bars, a channeled clip in which said transversely slidable bar is mounted and a dog pivoted to the clip and adapted to be engaged with notches in the transversely slidable bar to hold the same in position.

2. In combination, a pair of parallel bars, a pair of opposed hooks carried by said bars and adapted to be drawn apart and fixed in position, a third hook adapted to be moved transversely of the line of said first two hooks, and carried by a bar transversely slidable on one of said first mentioned bars, a channeled clip in which said transversely slidable bar is mounted, and a dog pivoted to the clip and adapted to be engaged with notches in the transversely slidable bar to hold the same in position, said notches being steep-faced on the side away from the hook to permit the hook to be drawn outward freely.

3. In combination, a pair of parallel bars, a pair of opposed hooks carried by said bars and adapted to be drawn apart and fixed in position, a third hook adapted to be moved transversely of the line of said first two hooks, and carried by a bar transversely slidable on one of said first mentioned bars, a channeled clip in which said transversely slidable bar is mounted, and a dog pivoted to the clip and adapted to be engaged with notches in the transversely slidable bar to hold the same in position, said clip having projecting lugs and said transversely slidable bar having lateral notches which may be registered with said lugs for the insertion and removal of the transversely slidable bar.

4. A retractor comprising two parallel bars, arms carried by said bars, one of said arms being movable, hooks on the arms opposed to each other, a sleeve on one of the bars, a channeled clip carried by the sleeve, a transversely slidable bar running in the clip and carrying a hook movable at right angles to the line of the first two mentioned hooks, the transversely slidable bar having ratchet notches in one face, a dog pivoted to the clip and provided with a tooth to engage the notches, and outwardly-turned ears on the dog whereby it may be depressed.

In testimony whereof I have hereunto set my hand this 20th day of June, 1918.

HAROLD M. BRIX.